United States Patent
LaVoie et al.

(10) Patent No.: US 8,543,676 B2
(45) Date of Patent: Sep. 24, 2013

(54) DELEGATED RESOURCE USE IN A CONTENT BASED ROUTING ENVIRONMENT

(75) Inventors: Jason D LaVoie, Westford, MA (US);
Daniel C. Gurney, Westford, MA (US);
Daniel M. Jamrog, Westford, MA (US);
Chester E. Ryder, III, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 13/090,511

(22) Filed: Apr. 20, 2011

(65) Prior Publication Data

US 2011/0202678 A1 Aug. 18, 2011

Related U.S. Application Data

(63) Continuation-in-part of application No. 12/485,653, filed on Jun. 16, 2009, now Pat. No. 8,176,161.

(51) Int. Cl.
*G06F 15/173* (2006.01)

(52) U.S. Cl.
USPC ............................ 709/223; 709/203; 709/217

(58) Field of Classification Search
USPC .......................... 709/223, 224, 203, 217, 219
See application file for complete search history.

(56) References Cited

U.S. PATENT DOCUMENTS

| 6,816,457 | B1 | 11/2004 | Bahattab | |
| 6,885,388 | B2 * | 4/2005 | Gunter et al. | 715/751 |
| 7,346,695 | B1 | 3/2008 | Masters | |
| 7,552,210 | B1 * | 6/2009 | Blum et al. | 709/223 |
| 7,831,712 | B1 | 11/2010 | Masters | |
| 7,856,659 | B2 | 12/2010 | Keeler et al. | |
| RE42,892 | E * | 11/2011 | Montulli | 709/229 |
| 8,219,802 | B2 * | 7/2012 | Doleh et al. | 713/155 |
| 2002/0112155 | A1 * | 8/2002 | Martherus et al. | 713/155 |
| 2002/0162019 | A1 | 10/2002 | Berry et al. | |
| 2002/0199014 | A1 * | 12/2002 | Yang et al. | 709/238 |
| 2003/0236977 | A1 * | 12/2003 | Levas et al. | 713/158 |
| 2004/0044768 | A1 * | 3/2004 | Takahashi | 709/225 |
| 2004/0123140 | A1 * | 6/2004 | Toomey | 713/201 |
| 2005/0091244 | A1 * | 4/2005 | Marcotte | 707/100 |
| 2006/0036875 | A1 * | 2/2006 | Karoubi | 713/191 |
| 2006/0156387 | A1 * | 7/2006 | Eriksen | 726/3 |
| 2006/0230265 | A1 * | 10/2006 | Krishna | 713/158 |

(Continued)

OTHER PUBLICATIONS

U.S. Appl. No. 12/485,653, filed Jun. 16, 2009 by Jason D. LaVoie, et al.

(Continued)

*Primary Examiner* — Lashonda Jacobs
(74) *Attorney, Agent, or Firm* — Robert H. Frantz; David A. Mims, Jr.

(57) ABSTRACT

A router or router process directs computer network traffic by, upon receipt of an access request to a network resource, determining that the request contains at least one routing cookie; determining a cookie scope of the routing cookie; responsive to the cookie scope being unequivalent to a root value, designating the at least one routing cookie as a delegate cookie; adding a path value associated the delegate cookie to a session lookup table entry for a user associated with the network traffic; and subsequently, using the lookup table entry to determine a destination address for redirecting computer network traffic for the user having the delegate cookie to a delegated resource located in the network at the path.

12 Claims, 9 Drawing Sheets

(56) References Cited

U.S. PATENT DOCUMENTS

| | | | |
|---|---|---|---|
| 2006/0277594 A1* | 12/2006 | Chiavegatto et al. | 726/2 |
| 2007/0002869 A1 | 1/2007 | Miller | |
| 2007/0106815 A1 | 5/2007 | Harvey et al. | |
| 2007/0112789 A1 | 5/2007 | Harvey et al. | |
| 2007/0112877 A1 | 5/2007 | Harvey et al. | |
| 2007/0226358 A1* | 9/2007 | Krywaniuk | 709/229 |
| 2008/0244719 A1* | 10/2008 | Hariya et al. | 726/8 |
| 2009/0249440 A1* | 10/2009 | Platt et al. | 726/1 |
| 2009/0254978 A1* | 10/2009 | Rouskov et al. | 726/4 |
| 2009/0282239 A1* | 11/2009 | Doleh | 713/155 |
| 2010/0107234 A1* | 4/2010 | Aldor et al. | 726/9 |
| 2010/0145960 A1* | 6/2010 | Casteel et al. | 707/756 |
| 2010/0263030 A1* | 10/2010 | Dawson et al. | 726/6 |
| 2010/0299406 A1* | 11/2010 | Murata | 709/219 |
| 2010/0318679 A1 | 12/2010 | LaVoie | |
| 2010/0319068 A1* | 12/2010 | Abbadessa et al. | 726/21 |
| 2012/0291141 A1* | 11/2012 | Doleh et al. | 726/28 |

OTHER PUBLICATIONS

U.S. Appl. No. 12/962,949, filed Dec. 8, 2010 by Jason D. LaVoie, et al.

IOSUP, Alexandru, et al; "Inter-operating grids through Delegated Match Making", Scientific Programming 15 (2008) 233-253, IOS Press, retrieved on Feb. 16, 2011 from citeseerx.ist.psu.edu/.

IBM; "Defining delegated resources", z/OS V1R9.0 Security Server RACF Security Administrator's Guide SA22-7683-11, retrieved on Feb. 16, 2011 from http://publib.boulder.ibm.com/infocenter/zos/v1r9/.

* cited by examiner

| Type 901 | Servers 902 | Resource 903 | Distinguished Name 904 | SAML Timeout 905 | User ID 906 | Role 907 | Status 908 |
| --- | --- | --- | --- | --- | --- | --- | --- |

Fig. 9

DELEGATED RESOURCE USE IN A CONTENT BASED ROUTING ENVIRONMENT

CROSS-REFERENCE TO RELATED APPLICATIONS

Claiming Benefit Under 35 U.S.C. 120

This application is a continuation-in-part of U.S. patent application Ser. No. 12/485,653, now U.S. Pat. No. 8,176,161, filed on Jun. 16, 2009, by Jason D. LaVoie, et a!.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

This disclosure relates to routing and, more particularly, to routing network traffic based on a unique identifier. This is a continuation-in-part of U.S. patent application Ser. No. 12/485,653, filed on Jun. 16, 2009, by Jason D. LaVoie, et al.

2. Background Information

Client/server applications are ubiquitous in today's networked computing environment. Users may access software and services provided by a server from virtually any networked client device. For example, a user of a web-based email service may access his or her email from a personal computer, a public computer, a work computer, a personal digital assistant ("PDA"), a cell phone, or any other device.

The server or servers that provide the email service typically may store and retain the user's data, including the user's email and account settings. If there are many users of the service, multiple servers may be needed to process all the requests from the users. Typically, when a user accesses the service, his or her request may be passed to one of the servers (or one group/cluster of servers) for processing.

The user request may take the form of network traffic. For example, when a user signs into his or her web-based email account, the web-based email account may generate network traffic that travels from the user's device to the server and vice versa. The network traffic may include user data, such as a username, password, an authentication, or a combination of username, password, and authentication, for example. The network traffic may also include data specific to the application, such as email data or other data. As one skilled in the art will recognize, data specific to the application may be typically encapsulated in an application layer of the network traffic, such as OSI layer-7 data.

The network traffic sent by the client device typically may include a network destination address. The client device or client application may receive the network destination address, which may be the address of a reverse proxy server (or network router) provided to the client device, provided to it by a directory name search ("DNS") service, for example. Typically, the DNS references a reverse proxy, not any of the back end servers directly. The client device may then send the network traffic out onto a network where the network traffic is eventually routed to the network traffic's destination.

Since the user's network traffic may be received by any of the servers, the servers may have to synchronize the user's data. For example, each server may have to retain a copy of the user's data in case the server receives a request from the user to access the data. When the data changes, all the servers may have to synchronize the user's data so that the user does not access out-of-date data. This approach may be problematic because each server will have to maintain its own storage, and because constant synchronization between the servers may cause network contention. Alternatively, each server may have to access a centralized data store that retains a single copy of the data. This approach also may be problematic because it requires a central data store with significant processing power and storage fabric bandwidth. This approach may also cause storage fabric contention. Alternatively, a system may have multiple back-end data stores. This approach is also problematic because it requires synchronization between the back-end data stores so that the user does not access out-of-date data. The constant synchronization with this approach can also cause network contention and result in a user accessing out-of-date data.

As such, in a client-server environment where application logic and application data exist on the same servers, routing users to back-end servers has a problem of routing the user to the correct back-end server or having to replicate the data to every back-end server. The present inventors' previous patent application, from which the present application is a continuation-in-part, addresses this problem using a solution which implements a real-time look-up to route users to a specific back-end server. However, the inventors have also discovered that a similar problem occurs for routing users to the correct back-end server when they are dealing with a delegated resource. A delegated resource is a resource whose owner has delegated a different user to manage the resource in the user's place. The problem is how to properly determine where to route the delegate user when the delegate user may have their own resource(s) along with one or more delegated resource(s).

BRIEF SUMMARY OF THE INVENTION

An enhanced router directs computer network traffic by, upon receipt of an access request to a network resource, determining that the request contains at least one routing cookie; determining a cookie scope of the routing cookie; responsive to the cookie scope being unequivalent to a root value, designating the at least one routing cookie as a delegate cookie; adding a path value associated the delegate cookie to a session lookup table entry for a user associated with the network traffic; and subsequently, using the lookup table entry to determine a destination address for redirecting computer network traffic for the user having the delegate cookie to a delegated resource located in the network at the path.

BRIEF DESCRIPTION OF THE DRAWINGS

The following figures, wherein like reference numbers in the drawings denote like elements, are useful in understanding one or more embodiments of the invention and its use, when taken in conjunction with the present disclosure.

DETAILED DESCRIPTION OF THE INVENTION

As previously discussed, in a client-server environment where application logic and application data exist on the same servers, routing users to back-end servers has a problem of routing the user to the correct back-end server or having to replicate the data to every back-end server. The present inventors' previous patent application, from which the present application is a continuation-in-part, addresses this problem using a solution which implements a real-time look-up to route users to a specific back-end server. However, the inventors have also discovered that a similar problem occurs for routing users to the correct back-end server when they are dealing with a delegated resource. A delegated resource is a resource whose owner has delegated a different user to manage, access, read, or manipulate, or a combination of manage, access, read and manipulate, all or part of the resource in the user's place. The problem is how to properly determine where to route the delegate user when the delegate user may have their own resource(s) along with one or more delegated resource(s). This solution, in at least one embodiment, extends from the invention set forth in the parent patent application, to allow the delegate user to access multiple delegated resources along with their own resources in a routed environment. The present disclosure will set forth at least one embodiment relative to an enhancement or further functionality of the invention described in the parent patent application. Those skilled in the relevant arts will recognize, however, that the present invention may be useful in conjunction with other routers and routing processes, and as such, this particular illustrative embodiment does not represent the only embodiment of the present invention.

Embodiment Options.

As will be appreciated by one skilled in the art, the invention set forth in the parent patent application, and described for illustration herein, may be embodied as a system, method or computer program product. Accordingly, the invention may take the form of a hardware-based embodiment, a software-based embodiment (including firmware, resident software, micro-code, etc., recorded or encoded by a computer readable storage device), or an embodiment combining software and hardware aspects that may all generally be referred to herein as a "circuit," "module," or "system."

Any combination of one or more computer-readable storage devices may be utilized. The computer-readable storage device may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage device could even be paper or another suitable medium upon which a computer program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium (i.e. computer-readable storage device) may be any medium that can contain, or store a program for use by or in connection with an instruction execution system, apparatus, or device.

Computer program code for carrying out operations of the invention may be written in an object oriented programming language such as Java™, Smalltalk™, C++™, or the like. However, the computer program code for carrying out operations of the invention may also be written in conventional procedural programming languages, such as the "C" programming language or similar programming languages. The program code may execute entirely on the user's computer, partly on the user's computer, as a stand-alone software package, computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations, block diagrams of methods, apparatus (systems) and computer program products according to embodiments of the invention. It will be understood that each block of the flowchart illustrations, block diagrams, and combinations of blocks in the flowchart illustrations and block diagrams, can be implemented by computer program instructions stored on computer readable storage devices, hardware logic circuits, or a combination of program instructions and logic circuits. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage device that can direct a computer or other programmable data processing apparatus to function in a particular manner, such that the instructions stored in the computer-readable memory produce an article of manufacture including instruction means which implement the functions/acts specified in the blocks shown in the flowchart(s) and block diagram(s).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the blocks shown in the flowchart(s) and block diagram(s).

Figure 1:
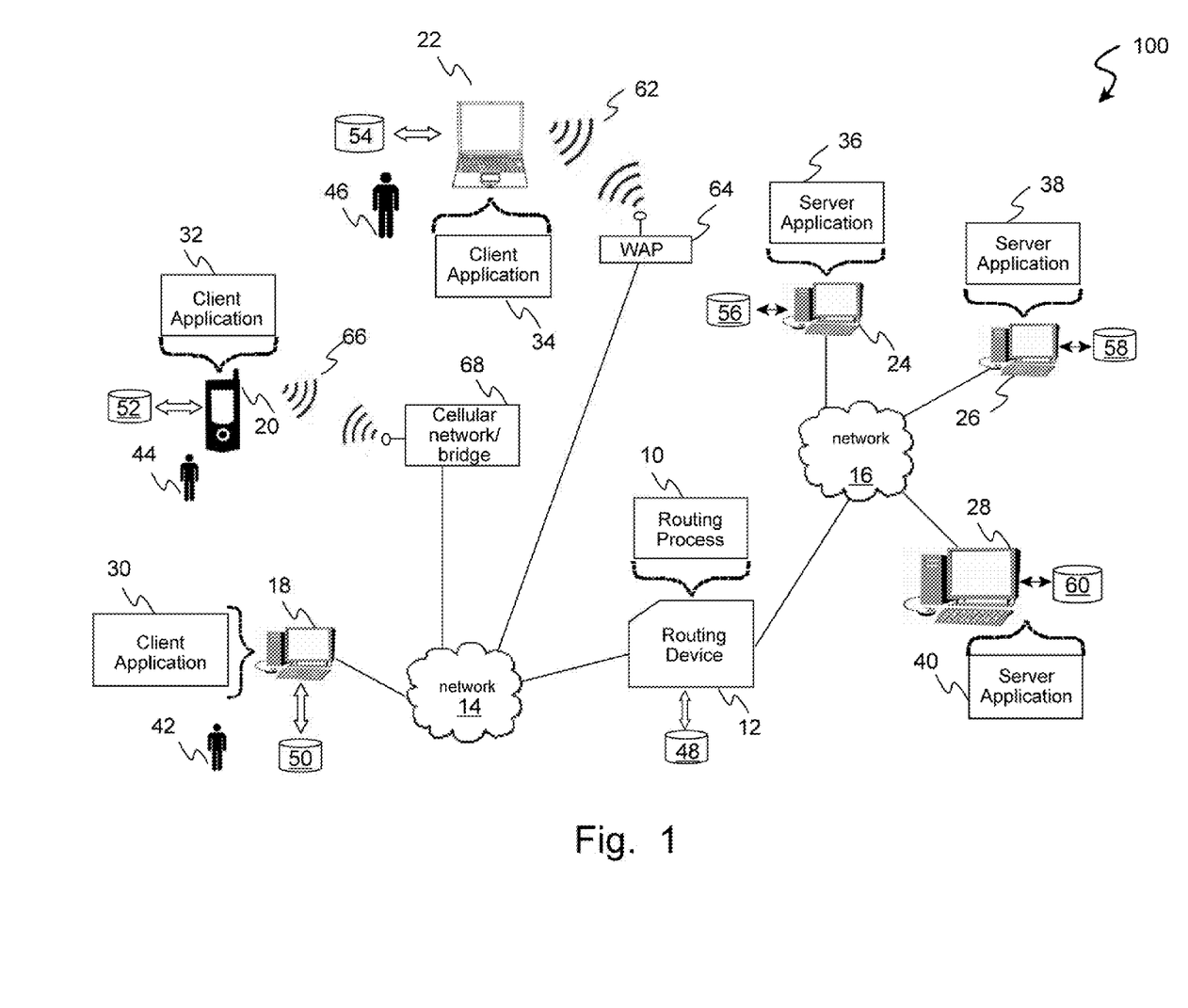
FIG. 1 is diagrammatic view of a routing process coupled to a distributed computing network.

Referring to the figures, FIG. 1 depicts a computing platform within which routing logical process (10) may operate. Routing (10), for example, may reside on and may be executed by routing device (12) (e.g. a "router"), which may be connected to multiple networks (e.g., the Internet, wide area networks, local area networks, etc.) and may route network traffic between the networks. In FIG. 1, routing device (12) is shown connected to network (14) and network (16). Routing device (12) may be a dedicated routing device, a switch, a hub, or a computing device executing program instructions that route network traffic. In general, routing device (12) may be any device that routes network traffic. Examples of routing device (12) may include, but are not limited to: a personal computer, a server computer, a series of server or personal computers, a mini computer, and a mainframe computer, a router, a network switch, a network hub, etc.

Various network devices may be connected to networks (14) and (16). For example, computer (18), personal digital assistant (PDA) (20), and laptop (22) are shown connected to network (14). Also, servers (24, 26, 28) are shown connected to network (16). As one skilled in the art will recognize, any network device may connect to any network connected to routing device (12).

FIG. 1 also depicts client applications (30, 32, 34), which may reside on and may be executed by computer, PDA, and laptop, respectively. Also, server applications (36, 38, 40) may reside on and be executed by servers (24, 26, and 28), respectively. Client applications (30, 32, 34) and server applications (36, 38, 40) may constitute a client/server application. For example, client applications (30, 32, 34) may be email client applications executed by the various client devices, and server applications (36, 38, 40) may be email server applications executed by email servers. Client applications (30, 32, 34) may communicate with server applications (36, 38, 40), for example, to send and receive email. For example, if users (42, 44, 46) access client applications (30, 32, 34) to check or send email, client applications (30, 32, 34) may send email data to server applications (36, 38, 40), receive email data from server applications (36, 38, 40), or a combination of send and receive email data. During the course of client/server communication, the email data may travel through network (14), routing device (12), network (16), or any combination of the networks (14, 16) and routing device. Although this example uses email clients and servers as an illustration, one skilled in the art will recognize that the routing logical process may operate with any type of network traffic and any type of client/server application.

The instruction sets and subroutines of routing process (10) may be stored on storage device (48), coupled to routing device (12). Storage device (48) may be a computer readable storage device, which may include hard disk drives, solid state drives, tape drives, optical drives, RAID arrays, random access memory (RAM), read-only memory (ROM), etc. Routing device (12) may also include a processor (not shown) which may execute the instruction sets and subroutines of routing process (10). As will be discussed below in greater detail with respect to the invention set forth in the parent patent disclosure, the instruction sets and subroutines of routing process (10) may cause routing device's (12) processor(s) to perform operations including: associating a unique identifier with at least one application server, receiving network traffic that may include the unique identifier and an intended network address, identifying at least one of the application servers associated with the unique identifier, and forwarding the network traffic.

Similarly, the instruction sets and subroutines of client applications (30, 32, 22) may reside on storage devices (50, 52, 54), respectively, and may be executed by one or more processors coupled to computer (18), PDA (20), and laptop (22), respectively; and the instruction sets and subroutines of server applications (36, 38, 40) may reside on storage devices (56, 58, 60), and may be executed by one or more processors coupled to server computers (24, 26, 28), respectively. Storage devices (48, 50, 52, 54, 56, 58, 60) may include hard disk drives, solid state drives, tape drives, optical drives, RAID arrays, random access memory (RAM), read-only memory (ROM), etc.

The various network devices shown in FIG. 1, including routing device (12), computer (18), PDA (20), laptop (22), and servers (24, 26, 28) may run network operating systems, examples of which may include but are not limited to: Microsoft Windows XP™ Server; Novell™ Netware™; or Redhat™ Linux™, for example (Windows XP is a registered trademark of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). Alternatively, the various network devices in FIG. 1 may run custom operating systems, custom network operating systems, custom software applications, or combinations thereof, that allow the various network devices to operate.

The instruction sets and subroutines of routing process (10), client applications (30, 32, 34), and server applications (36, 38, 40) may be generated through the use of a compiler, such as the IBM™ XL compiler, the Visual Studio™ compiler, or an assembler, for example (Visual Studio is a registered trademark of Microsoft Corporation in the United States, other countries, or both). The instruction set and subroutines may also be generated as scripts, such as JavaScript™ scripts, Tcl scripts, or as other types of software code (Java and all Java-based trademarks and logos are trademarks of Sun Microsystems, Inc. in the United States, other countries, or both). In general, and as is known in the art, the instruction sets and subroutines of routing process (10), client applications (30, 32, 34), and server applications (36, 38, 40) may be generated via any method of generating instruction sets and subroutines that may be executed by a processor.

As mentioned, various client electronic devices may be coupled to network (14). Examples of client electronic devices may include, but are not limited to: routing device (12), computer (18), PDA (20), laptop (22), server computers (24-28), a data-enabled, cellular telephone (not shown), and a dedicated network device (not shown). One or more users (e.g., user 42, 44, 46) may access the various tools and applications, such as routing process (10), client applications (30, 32, 34), or server applications (36, 38, 40) from any other device connected to networks (14, 16) or directly from the device on which the tool or application resides.

Network devices may be coupled directly to network (14, 16), or may be indirectly coupled to network (14, 16) through routing device (12). For example, computer (18) is shown directly coupled to network (14). However, computer (18) may access network (16) and network devices connected to network (16) indirectly, by sending network traffic through routing device (12).

The various client electronic devices may also be directly or indirectly coupled to networks (14, 16) through various types of wired and wireless connections. For example, routing device (12) is shown directly coupled to networks (14, 16) via hardwired network connections. Laptop (22) is shown wirelessly coupled to network (14) via wireless communication channel (62) established between laptop (22) and wireless access point (WAP) (64), which is shown directly coupled to network (14). WAP (64) may be, for example, an IEEE 802.11a, 802.11b, 802.11g, Wi-Fi, or Bluetooth™ device that is capable of establishing wireless communication channel (62) between laptop (22) and WAP (64). PDA (20) is shown wirelessly coupled to network (14) via cellular communication channel (66) and cellular network/bridge 68, which is shown directly coupled to network (14).

As is known in the art, all of the IEEE 802.11 specifications may use Ethernet protocol and carrier sense multiple access with collision avoidance (i.e., CSMA/CA) for path sharing. The various 802.1 specifications may use phase-shift keying (i.e., PSK) modulation or complementary code keying (i.e., CCK) modulation, for example. As is known in the art, Bluetooth™ is a telecommunications industry specification that allows e.g., mobile phones, computers, and personal digital assistants to be interconnected using a short-range wireless connection.

Figure 2:
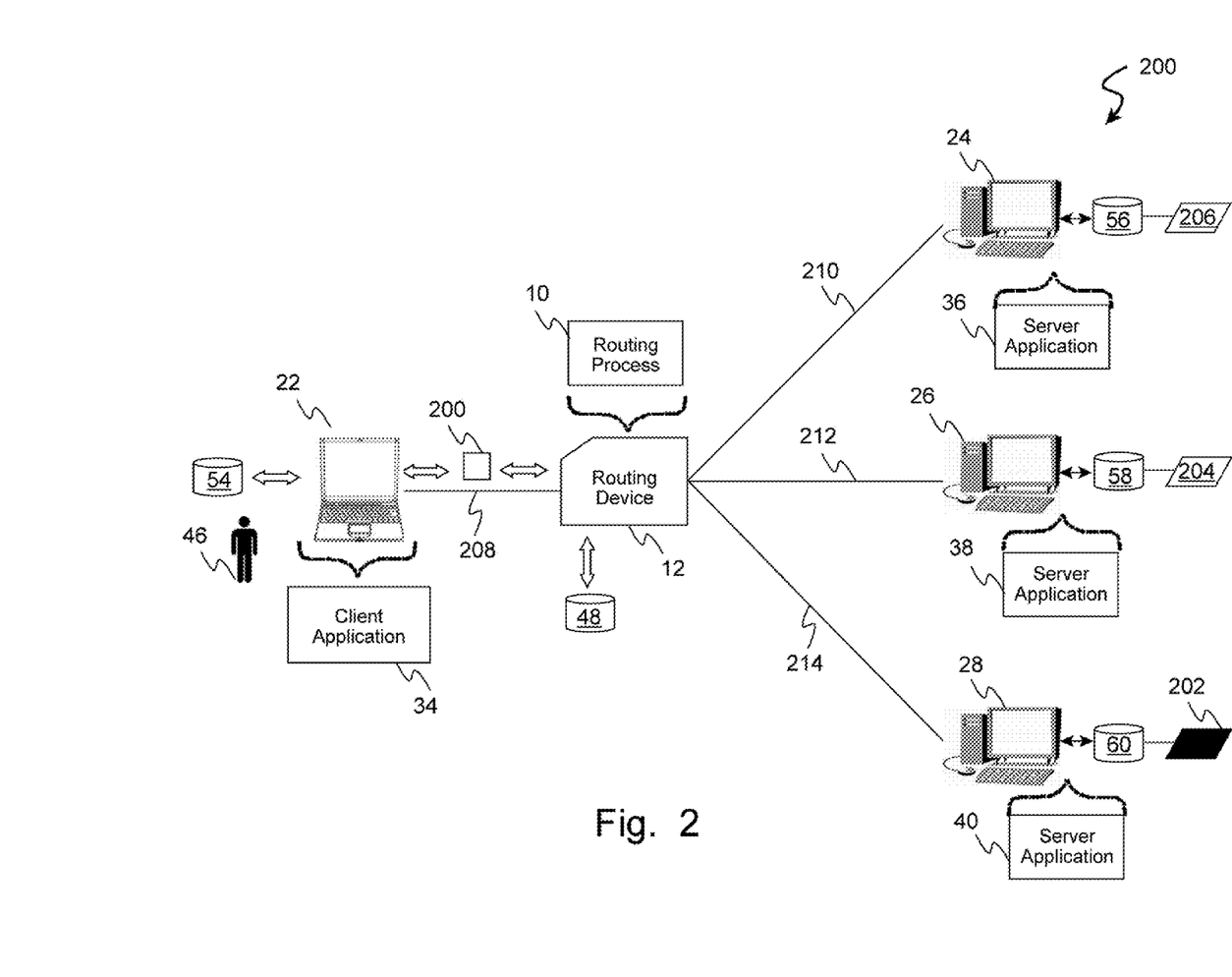
FIG. 2 is a simplified view of the diagrammatic view of FIG. 1.

FIG. 2 is a simplified version of the computing infrastructure of FIG. 1, for the purpose of illustrating how a client device may access server applications (36, 38, 40) through routing device (12). In FIG. 2, laptop (22) is shown connected to routing device (12), which is connected to server computer (24, 26, 28). As mentioned, routing device (12) may be a routing device that connects two or more networks. In this example, laptop 22 may be on one network, and server computer (24, 26, 28) may be on another network, connected together by routing device (12). Although not shown, server computer (24, 26, 28) each may be a single sever, or a group/cluster of servers that execute server applications (36, 38, 40).

Content-Based Routing as Disclosed in the Related Patent

Overview of the Related Patent Disclosure.

In an embodiment of the invention disclosed in the parent patent from which the present disclosure is a continuation-in-part, a method of routing computer network traffic includes associating, on a routing device, a unique identifier with at least one application server running an application. The content-based routing device receives network traffic that includes the unique identifier and an intended network address. In response to receiving the network traffic at least one of the application servers associated with the unique identifier is identified. The network traffic is forwarded to at least one of the application servers associated with the unique identifier.

One or more of the following features may be included in an embodiment according to the content-based routing invention. The network traffic may be forwarded to one or more second application servers associated with the unique identifier if the one or more application servers are not available. Identifying at least one of the application servers may include performing a directory lookup based on the unique identifier, and receiving a list of the one or more application servers associated with the unique identifier. The list may be sorted in a priority order for routing. The intended network address also may be overwritten with an address of at least one of the application servers associated with the unique identifier.

The unique identifier may include information identifying a user of the application running on the at least one application server. A storage device of the at least one application server may store data associated with the unique identifier; and the data may exist only on one application server associated with the unique identifier. The unique identifier may also be included in application layer network traffic.

In another embodiment, a computer program product for routing computer network traffic resides on a computer readable storage device. The computer program product includes a plurality of instructions, which, when executed by a processor, cause the processor to perform operations including associating a unique identifier with at least one application server running an application. The operations also cause the processor to receive network traffic that includes the unique identifier and an intended network address. In response to receiving the network traffic, at least one of the application servers associated with the unique identifier is identified. The network traffic is forwarded to at least one of the application servers associated with the unique identifier.

One or more of the following features may be included. The network traffic may be forwarded to one or more second application servers associated with the unique identifier if the one or more application servers are not available. Identifying at least one of the application servers may include performing a directory lookup based on the unique identifier, and receiving a list of the one or more application servers associated with the unique identifier. The list may be sorted in a priority order for routing. The intended network address also may be overwritten with an address of at least one of the application servers associated with said unique identifier.

The unique identifier may include information identifying a user of the application running on the at least one application server. A storage device of the at least one application server may store data associated with the unique identifier; and the data may exist only on one application server associated with said unique identifier. The unique identifier may also be included in application layer network traffic.

In another embodiment, system includes one or more processors, one or more computer readable storage devices coupled to the one or more processors, and one or more software instructions residing on the one or more computer readable storage devices, which, when executed by the processor, cause the processor to perform operations. The operations include associating a unique identifier with at least one application server running an application. The operations may also include receiving network traffic that includes the unique identifier and an intended network address. In response to receiving said network traffic, at least one of the application servers associated with the unique identifier may be identified. The network traffic may be forwarded to at least one of the application servers associated with the unique identifier.

One or more of the following features may be included in an embodiment according to the content-based routing invention. The network traffic may be forwarded to one or more second application servers associated with the unique identifier if the one or more application servers are not available. Identifying at least one of the application servers may include performing a directory lookup based on the unique identifier, and receiving a list of the one or more application servers associated with the unique identifier. The list may be sorted in a priority order for routing. The intended network address also may be overwritten with an address of at least one of the application servers associated with the unique identifier.

The unique identifier may include information identifying a user of the application running on the at least one application server. A storage device of the at least one application server may store data associated with the unique identifier; and the data may exist only on one application server associated with the unique identifier. The unique identifier may also be included in application layer network traffic.

The details of one or more implementations are set forth in the accompanying drawings and the following paragraphs. Other features and advantages will become apparent from the description, the drawing, and the claims.

More Details of the Content-Based Router.

In a typical scenario, user (46) may wish to check his or her email. User (46) may then access client application (34) (an email client, in this example), and may enter his or her username and password. Subsequently, client application (34) may attempt to send data, e.g. Network traffic (200), that includes user's (46) username and password to a server, such as server computers (36, 38, 40). In at least one embodiment, authentication is performed at the server side, which allows network traffic to start even sooner.

Servers (24, 26, 28) may be servers of the same application. For example, servers (24, 26, 28) may all be email servers that provide service for an email system. As noted, servers (24, 26, 28) each may be single servers or groups/clusters of servers. In FIG. 2 and this example, however, only server (28) may retain a copy of user's (46) data. Server (28) may store data (202), which may include user's (46) data, as illustrated by the shading of data (202). Data (204, 206) (and therefore servers (24, 26)) may not include user's (46) data, for example. Therefore, as user (46) attempts to access his or her email, user (46) may be directed to server (28).

Network traffic (200) may be data or information that may be transmitted across or through a computer network. FIG. 2 shows Network traffic (200) transmitted through network connection (208). Although not shown, Network traffic (200) may be data or information transmitted through any network, e.g. network connections (210, 212, 214). Network traffic (200) may include various types of network data and information. For example, Network traffic (200) may include a network packet (e.g. an Internet Protocol (IP) packet), a network broadcast, or any type of data sent over a network.

Figure 3:
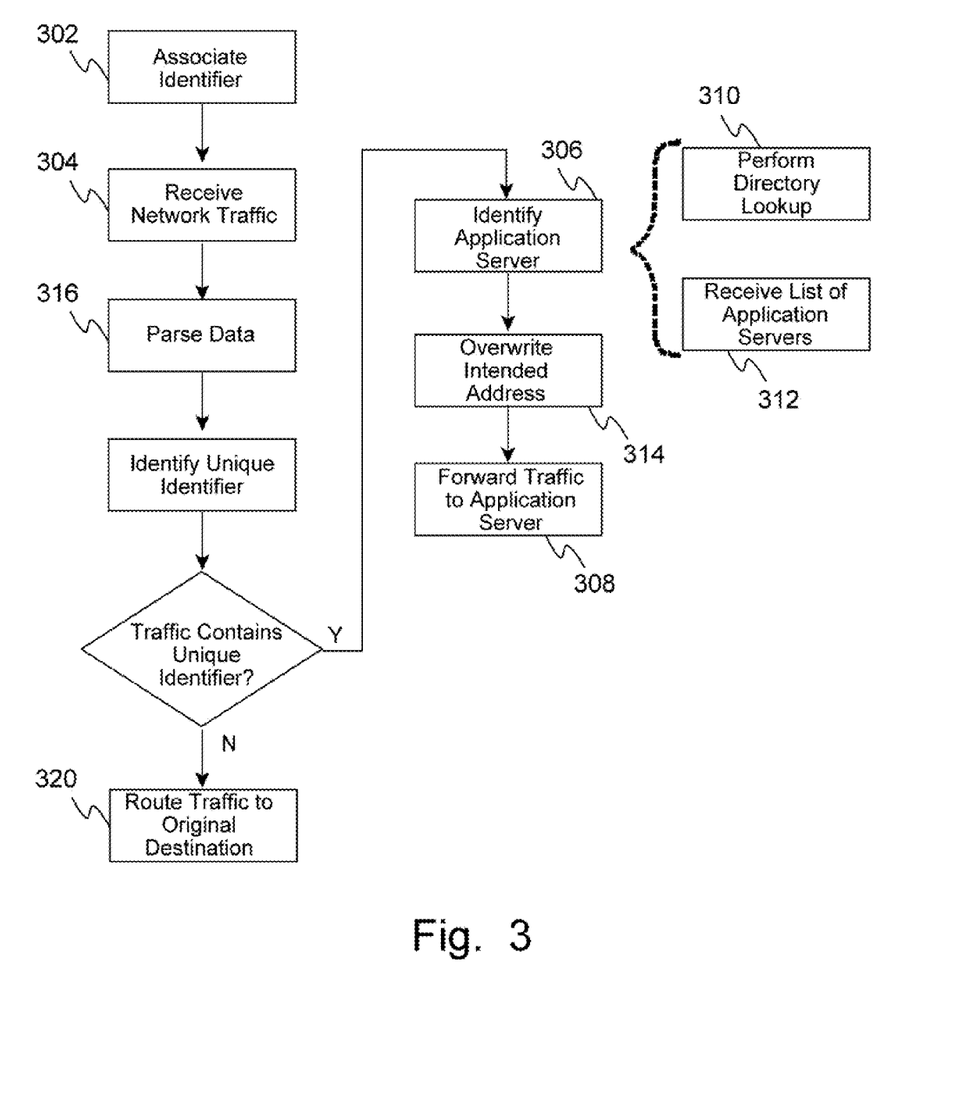
FIG. 3 is a flowchart diagram of a routing process.

Referring to FIG. 3, routing process (10) may allow user (46) to interact with server (28) (e.g., which may include user's (46) data), and may route data from user (46) to server (28), regardless of whether the data was originally intended for or addressed to server (28). For example, routing process (10) may associate (302) a unique identifier with at least one application server running an application. Routing process (10) may also receive (304) network traffic including the unique identifier and an intended network address. Routing process (10) may identify (306) at least one of the application servers associated with the unique identifier, and may forward (308) the network traffic to the application server(s) associated with the unique identifier. For example, if user (46) enters his or her username and password, client application (34) may send network traffic out onto the network to authenticate user's (46) username and password. Client application (34) may not be able to determine that user's (46) data resides on server (28), and not on servers (24, 26), so client application (34) may address the network traffic to routing device (12), server (24), or both servers (12, 24), for example. However, routing process (10) may have associated 302 a unique identifier (such as user's (46) username) with server (28). If the network traffic contains the unique identifier (i.e. user's (46) username and password), routing process (10) may, for example, perform (310) a directory lookup based on the unique identifier and receive (312) a list of servers associated with the unique identifier. Routing process (10) may then forward (308) the data to server (28) instead of routing device (12), server (24), or both routing device (12) and server (24), for example. In order to forward (308) the data to server (28), routing process (10) may overwrite (314) the network traffic's original network address (i.e. the address of routing device (12), server (24), or combination of routing device (12) and server (24)) with the address of one or more of the servers from the received (312) list of servers.

When routing process (10) receives (304) network traffic, routing process (10) may parse (316) the data contained in the network traffic to determine whether the network traffic contains a unique identifier. If the network traffic contains a unique identifier, routing process (10) may identify (318) the unique identifier to determine whether routing process (10) should forward (320) the network traffic to the network traffic's original destination, or whether routing process (10) should identify (306) an application server to which routing process (10) should forward (308) the network traffic, for example.

Figure 4:
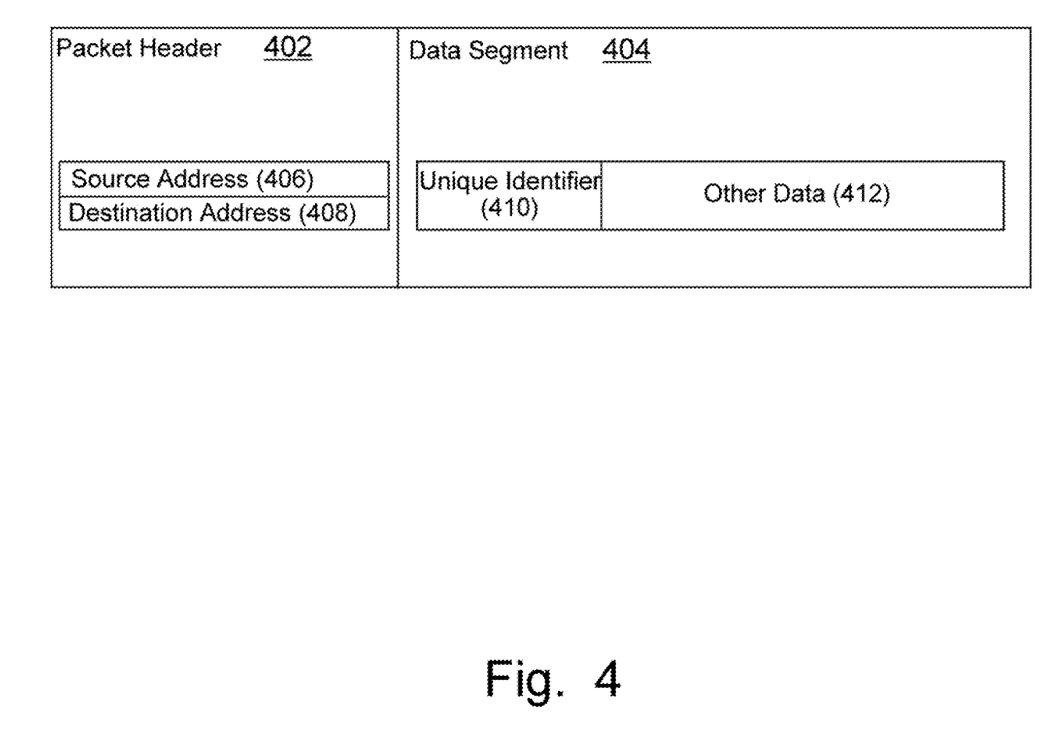
FIG. 4 is a diagrammatic view of a network traffic packet.

In an embodiment, the unique identifier may be information found within an application layer data of the network traffic. Using the internet protocol ("IP") as an example, Network traffic (200) may be an IP network packet, such as network packet (400), which may include a header section and a data section. FIG. 4 shows network packet (400) with packet header (402) and a data segment (404). Packet header (402) may include source address (406) and destination address (408). Source address (406) may identify the device that originated the network packet. For example, if laptop 22 (FIG. 2) originated the network packet, source address (406) may be the address of laptop 22. Similarly, destination address (408) may identify an intended destination address for the network packet. If client application (34) attempts to send network packet (400) to routing device (12), to server computer (24), or to bother routing device (12) and server computer (24), destination address (408) may contain the network address of routing device (12) and/or server computer (24). Using the IP protocol as an example, source address (406) and destination address (408) may be an IP address, typically represented as a series of four integers such as ###.###.###.###, for example. However, one skilled in the art will recognize that source address (406) and destination address (408) may be any type of networking address including, but not limited to: IPv4 addresses, IPv6 addresses, UDP addresses, token ring addresses, MAC addresses, universal serial bus ("USB") addresses, etc.

Upon receiving packet (400), routing process (10) may parse (316) data from data segment (404), which may include unique identifier (410). routing process (10) may employ any of a number of schemes to determine whether to parse (316) data from data segment (404). For example, routing process (10) may parse (316) data from every network packet received by routing device (12). Alternatively, routing process (10) may parse (316) data from network packets that contain a particular destination address, or a destination address that falls within a particular range. For example, routing process (10) may parse (316) the data from every packet addressed to a particular IP domain (e.g. every network packet addressed to a device in the 192.168.1.x subnet). As another example, routing process (10) may parse (316) data from network packets having a particular source address, or a source address that falls within a particular range of addresses. As another example, routing process (10) may parse (316) data from data from network packets that have a particular network packet format (e.g. TCP or UDP), or that contain a particular type of data. In general, routing process (10) may selectively choose and filter the network packets from which routing process (10) reads data, based on any information available within or associated with the network packet.

Data segment (404) may also include other data (412), which may be any other network traffic data. Routing process (10) may, for example, identify (318) unique identifier (410) by parsing (316) the data from data segment (404). Unique identifier (410) may be data that uniquely identifies user 46, i.e. the user attempting to access the server application. For example, unique identifier (410) may be user's (46) authenticated username, user's (46) unauthenticated username, or any other information that uniquely identifies user (46). Of course, unique identifier (410) need not be associated with a user. Unique identifier may be any data that associates network traffic with a specific server or group of servers. In another example, unique identifier (410) may be a global positioning system ("GPS") coordinate or range of coordinates associated with a particular server. In this example, the particular server may be assigned to process data that contains particular GPS coordinates, rather than data that identifies a particular user. The particular server may be, for example, assigned to service data that includes the GPS coordinates within a particular range.

Accordingly, data segment (404) may contain unique identifier (410), which may be a GPS coordinate, rather than a unique identifier that identifies a particular user. routing process (10) may identify (306) the server by parsing data segment (404), identifying (318) the GPS coordinates (or range of coordinates) within data segment (404), identifying (306) a server (or servers) associated with the GPS coordinates, and forwarding (308) packet (400) to the server associated with the parsed GPS coordination. As one skilled in the art will recognize, unique identifier may be any form or type of data that may be associated with or mapped to a server, including, but not limited to: a username, a password, a location, a temperature, a status identifier, a GUID, a version ID, and application ID, or any other type of data.

Figure 5:
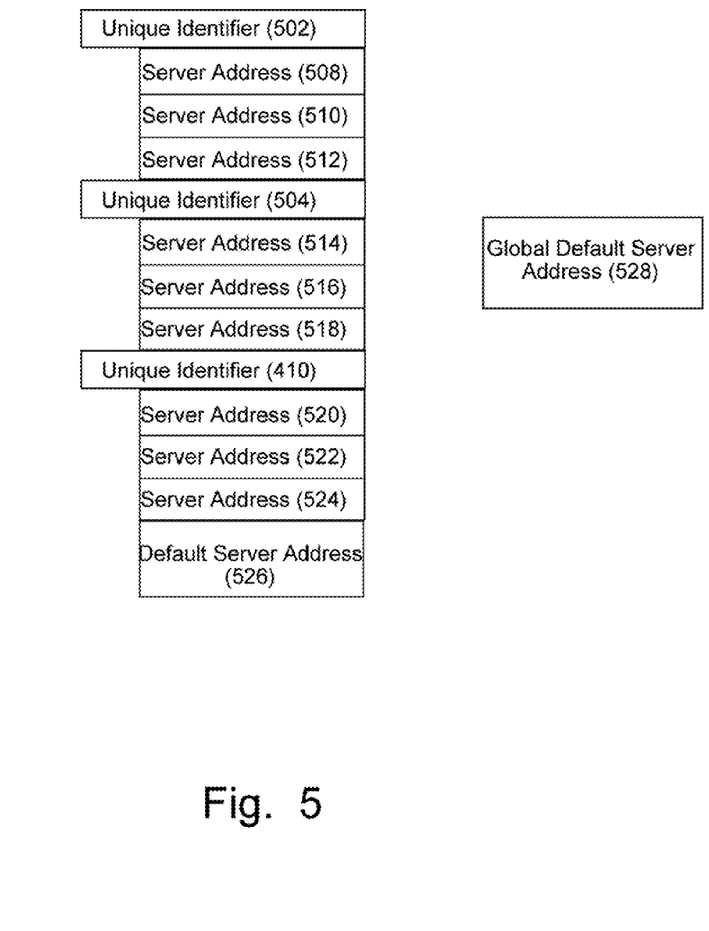
FIG. 5 is a table of associations between unique identifiers and server addresses

After receiving unique identifier (410), routing process (10) may identify 306 one or more application servers associated with unique identifier (410). As mentioned, and as shown in FIG. 2, user's (46) data may be stored on server (28). Continuing the example, routing process (10) may associate 302 user's (46) username (a unique identifier) with server (28). When routing process (10) receives network traffic containing user's (46) username, routing process (10) may perform 310 a directory lookup based on user's (46) username, for example. Referring to FIG. 5, routing process (10) or routing device (12), or both, may include a directory listing that associates unique identifiers with servers. FIG. 5 shows exemplary directory lookup table (500) with exemplary unique identifiers (502, 504, 410). Unique identifier (502) is shown associated with servers (508, 510, 512); unique identifier (504) is shown associated with servers (514, 516, 518); and unique identifier (410) is shown associated with unique identifiers (520, 522, 524). If routing process (10) receives network packet (400) with unique identifier (410), routing process (10) may perform (310) a directory or table lookup to determine if unique identifier (410) matches, for example, any of the unique identifiers listed in directory lookup table (500). If received unique identifier (410) matches a unique identifier in the lookup table, routing process (10) may receive a list of any or all servers associated with unique identifier (410). In this example, unique identifier (410) matches a unique identifier in directory lookup table (500). Accordingly, routing process (10) may receive (312) the list of application servers associated with routing process (10), namely servers (520, 522, 524), in this example.

The list of servers may be a prioritized list of servers (or groups of servers) to which routing process (10) should forward the network traffic. For example, the first server in the list, in this case server (520), may be the preferred server for servicing the client (e.g., user (46) utilizing client application (34) via laptop computer (22)) while the other servers in the list-in this case servers (522, 524) may be backup servers for servicing the client, or may be primarily utilized for servicing other clients, or for both servicing the client and other clients). Of course, the list may be prioritized in any order based on any rationale, such as computing power, physical location, up-time, etc.

Routing process (10), the list, or both, may also include a default server address. A default server address may be an address of a backup or default server that can process network traffic if the other servers are unavailable. For example, if all servers in the list are unavailable, routing process may forward (308) network packet (400) to a default server. FIG. 5 shows directory lookup table 500 having default server address (528) associated with unique identifier (410). If routing process (10) forwards (308) network packet (400) (including unique identifier (410)) to servers 520, 522, or 524, or a combination thereof of servers, but receives an error message because servers (520, 522, 524) are unavailable, routing process (10) may forward network packet 410 to the server having default server address (526).

As shown, a default server address may also be associated with a unique identifier. For example, default server address (526) is shown associated with unique identifier (410). If routing process (10) forwards (308) network packet (400) (including unique identifier (410)) to servers (520, 522, 524) and receives an error message because servers (520, 522, 524) are unavailable, routing process (10) may forward (308) network packet (400) to a default server address (528) (e.g. redirect a user to a default server) because default server address (528) is associated with unique identifier (410).

Default server addresses may also be global default server addresses. Global default server addresses may or may not be associated with unique identifiers. For example, global default server address (528) is shown as a global default server address. If a unique identifier is not associated with a default server address, routing process (10) may forward network traffic that includes the unique identifier to a global default server address for processing. For example, unique identifiers (502, 504) are not associated with a default server address. If routing process (10) receives a network packet that includes unique identifier (502) or unique identifier (504) and receives an error from the servers having server addresses associated with unique identifiers (502, 504) (namely server addresses (508, 510, 512) and server addresses (514, 516, 518), respectively), routing process (10) may forward the network packet (or redirect the user) to default server address (526).

Figure 6A:
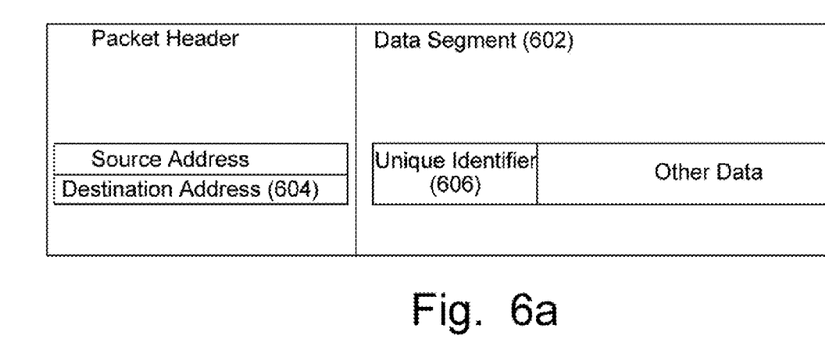
FIG. 6a is a diagrammatic view of a network traffic packet.
Figure 6B:
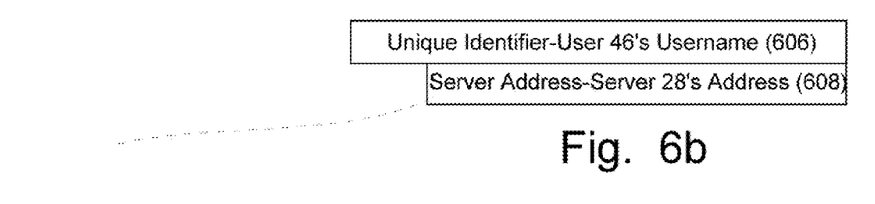
FIG. 6b is a table of associations between a unique identifier and a server address
Figure 6C:
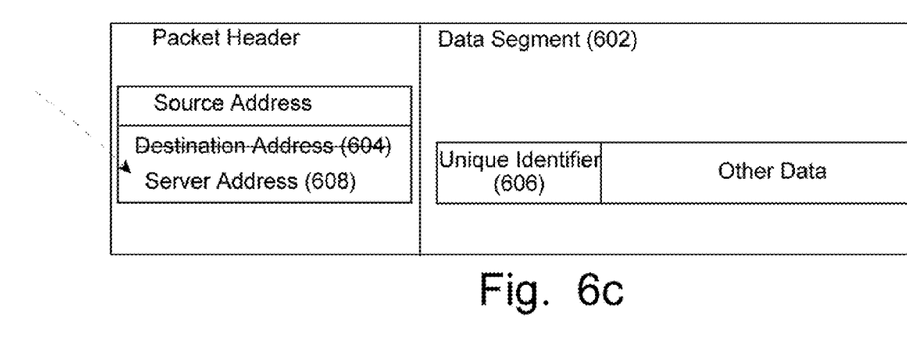
FIG. 6c is a diagrammatic view of a modified network traffic packet.

Turning to FIGS. 6a, 6b, and 6c, assume user (46) accesses client application (34) (an email client) and wishes to check his or her email. User (46) may then enter his or her username into application (34). In response, client application (34) may generate network packet (600). Client application (34) may include user's (46) username within network packet (600)'s data segment, i.e. data segment (602). Client application (600) may also initially set destination address (604) to the address of routing device (12) or server (24), for example. However, as discussed, user's (46) data (i.e. data 202) may not be stored on routing device (12) or server (24). Rather, data 202 may be stored on server computer (28).

When routing process (10) receives (304) network traffic from client application (34) (e.g., network packet (600)), routing process (10) may parse (316) data segment (602) and identify (318) user's (46) username as a unique identifier, i.e. unique identifier (606). As shown in FIG. 6b, routing process (10), routing device (12), or both, may contain or include lookup table (602), which may associate user's (46) username with server (28) (e.g., which may indicate that server (28) may store user's (46) data, and as such data traffic from user (46) should be directed to server (28)). Even though packet (600) was originally addressed to routing device (12) or server (24), routing process (10) may forward (308) packet (600) to server (28) because the lookup table associates user's (46) username with server (28). Accordingly, as shown in FIG. 6c, routing process (10) may overwrite (314) destination address (604) with address (608) (i.e. address of server (28)).

A number of implementations of the content-based router have been described. Nevertheless, it will be understood that various modifications may be made. Accordingly, other implementations are within the scope of the following claims.

Routing to Delegated and Owned Resources

As mentioned previously, in a client-server environment where application logic and application data exist on the same servers routing users to back-end servers has a problem of routing the user to the correct back-end server or having to replicate the data to every back-end server. The foregoing content-based routing invention addresses this problem using a real-time lookup to route users to a specific backend server. However, the present inventors have recognized that a similar problem occurs for routing users' network traffic to the correct backend server when they are managing, accessing, reading, or manipulating, or a combination of managing, accessing, reading and manipulating, all or part of a delegated resource.

Delegated Resources in General.

The term "delegated resource" is widely used in the relevant arts. Basically, a delegated resource is a computing resource whose owner has delegated a different user (other than the owner) to manage the resource in the owner's place. The problem that the present inventors have recognized is determining where and how to route network traffic on behalf of the delegate owner to the delegated resource when the delegate owner may have their own resources along with many other delegated resources. The following solution allows the delegate user to simultaneously access multiple delegated resources along with their own resources in a routed environment.

Cookie Scope in General.

The present invention uses "cookie scope" in a new way. The term "cookie scope" is widely used in the relevant arts. For example, community-edited Wikipedia presently states "[t]he cookie domain and path define the scope of the cookie, they tell the browser that cookies should only be sent back to the server for the given domain and path. If not specified, they default to the domain and path of the object that was requested."

Use of a cookie for routing purposes is well understood, however, the present invention employs cookie scope for routing network traffic to delegated resources in a new way. In essence, the invention leverages differences in cookie scope between multiple cookies to solve the routing problem to one or more delegated resources.

For example, a general routing cookie has the scope of/ (forward slash), while, according to the present invention, a cookie associated with delegated resources will have a scope of the individual resource path. If a routing cookie is present, it is used to determine where the user's network traffic should be routed and to specify that user is a delegated user as compared to being the owner of the targeted resource.

The logical processes of the present invention routes user network traffic at the routing layer based on the contents of a cookie once the initial real-time look up has been accomplished, as disclosed in the foregoing paragraphs regarding content-based routing. The present invention extends the content-based routing process by adding additional cookies which have a different scope from the original routing cookie. The original routing cookie has a scope of the root/(forward slash), wherein cookie scope is determined by the path associated with that particular cookie.

Delegation Routing Cookie(s).

The additional cookie(s) added for delegation, Delegated0, for example, has a scope of the path to the resource file associated with the delegated user, for example, data0/company/user1.nsf. A different instance of the web browser or segment within a browser (e.g. an HTML iFrame) for a different delegated user will have a different cookie scope, such as data1/company/user2.nsf. This allows a different cookie to be sent with the routing requests for individual resources. A problem with this approach, if limited to just this implementation, is it will not handle specialized files associated with the application and necessary for the application to function. Therefore, the invention further extends the approach by adding an additional cookie, such as Delegated1 having a scope of the path to the particular file for the delegated user. For example, for user Delegated0 above, a cookie Delegated1 is added to the process and system that is scoped to a specific file or resource located at data0/company/forms.

Accommodating Fail-over Scenarios.

The foregoing extensions to the logical processes for content-based routing is useful except for restrictions imposed by configurations in which fail-over is to be accommodated. Fail-over has a different path where /s/ is appended to the beginning of the resource path, and the path to the fail-over resource (delegated or not) can be different than the normal resource path. For example, the fail-over path for the user Delegated0 above could be /s/data0/company/user.nsf. As such, this extended routing scheme now requires four different cookies for each delegated user to accommodate content-based routing to delegated resources and fail-over, such as cookies named Delegated0, Delegated1, Delegated2, and Delegated3. Given that cookies are scoped to path, each request the router will receive from the user will contain only the general routing cookie and the delegated cookie for the path of the requested resource. This will allow for all possible Uniform Resource Locators (URLs) to be accommodated in the delegation and in the fail-over schemes.

Logical Flow, Communications Protocol and Interoperations.

Figure 7:
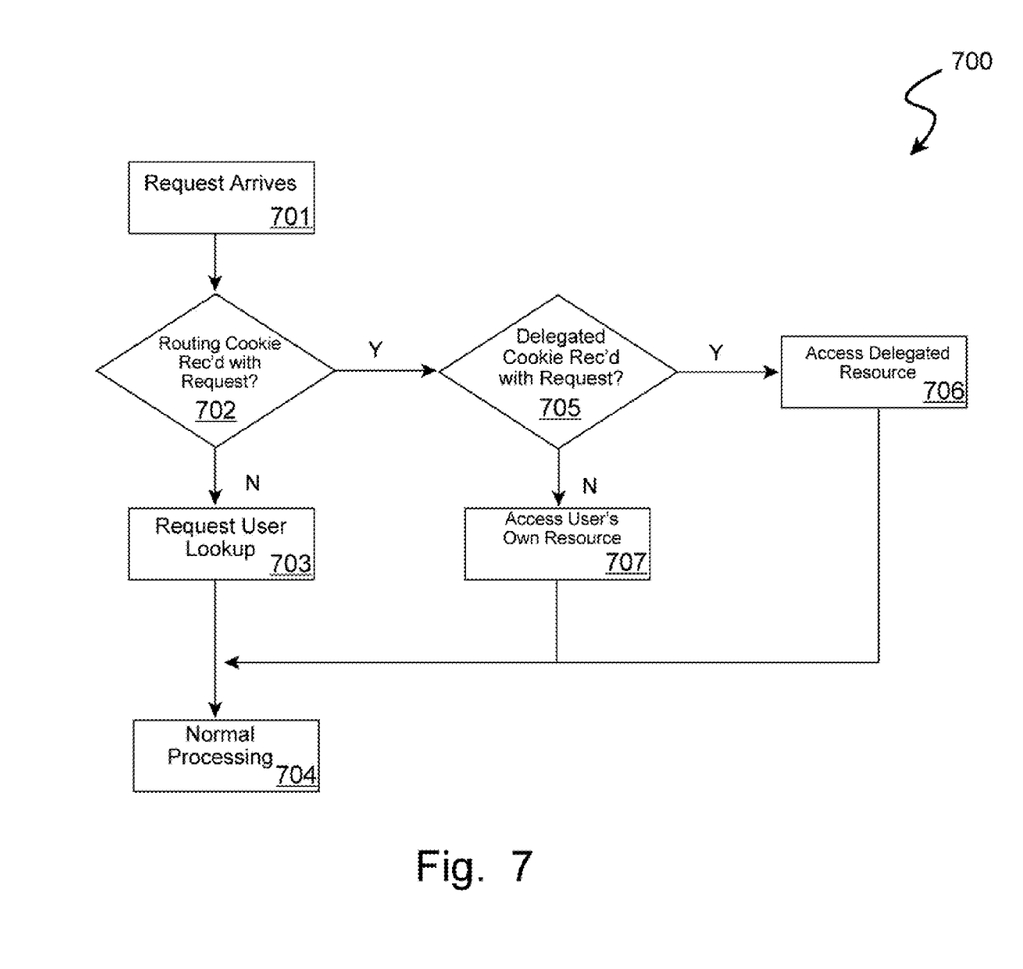
FIG. 7 shows a logical process for using new delegated resource routing cookies according to the present invention.

According to this new routing process, the router device (10) creates appropriate routing cookies, properly scoped, for each delegated user. The new scheme for interoperations and protocol also depends upon insertion of a new special parameter by each application program to force a look-up from the Authentication Server when delegation is initiated. This flow is detailed in the next section "Authentication Server and Session Table details". The new delegated routing cookie contains an encrypted pointer to the session table entry for the user associated with the traffic being routed. As shown in FIG. 7, upon receipt (701) of a new access request, if (702) no routing cookie is present, then the aforementioned content-based routing process is performed (703, 704). But, if (702) a routing cookie is present, but it is not (705) a delegated routing cookie (e.g. the URL or path of routing cookie is root/(forward slash)), all the requests will be routed to the user's own resources.

However, if (705) a delegated cookie is present in the request, the session entry for the delegated user is retrieved (706) and used for routing decisions such that all the user's requests will be sent to the correct delegated resource(s). The delegated cookies are associated with the paths, such as described above, and the router has one session table entry for all four of the delegated cookies.

Authentication Server and Session Table.

Figure 8:
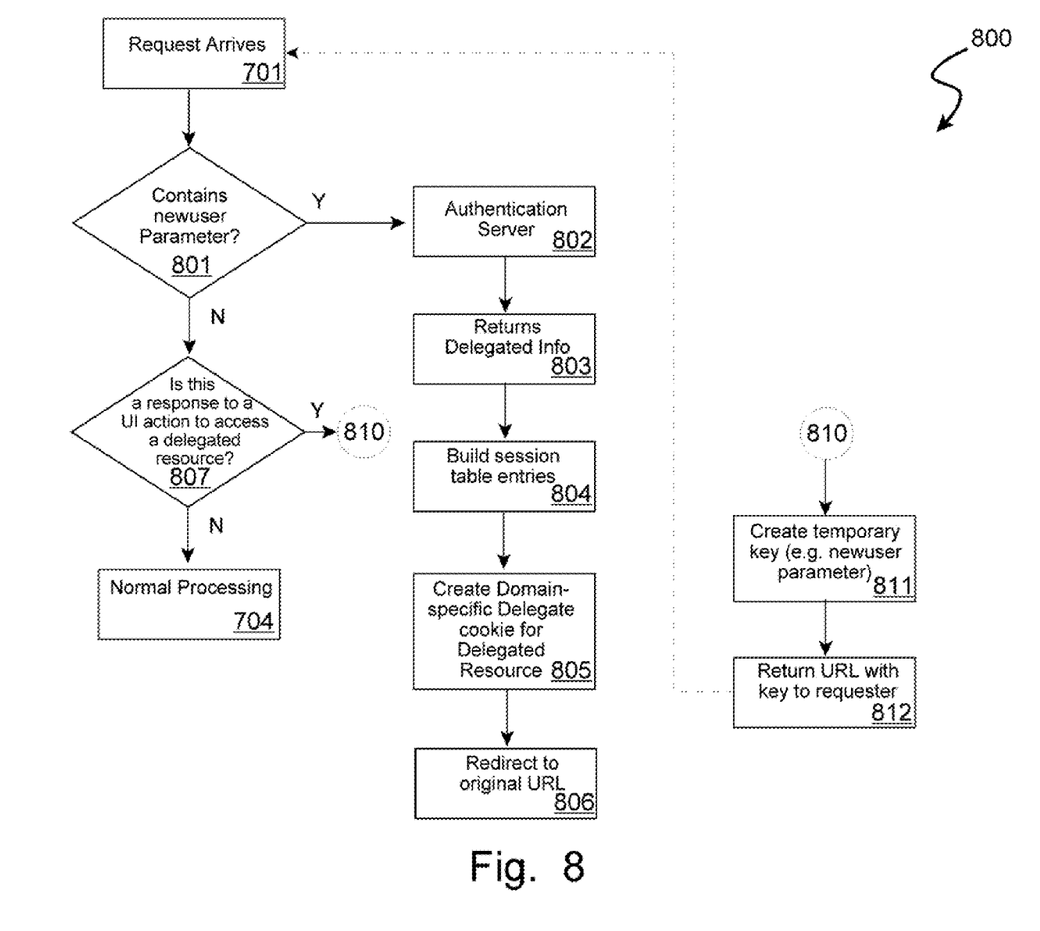
FIG. 8 shows a logical process for using new user parameter for delegated resource routing according to the present invention.

Referring now to FIG. 8, when the user selects a delegated user resource in a newly received request, the application will redirect with a new user parameter in the query string followed by the newuser parameter (e.g. a unique user identifier), for example:

HTTP://host/livemail/dat0/ . . . ?Open_doc . . . &newuser=923456

The enhanced router equipped with the content-based routing process and the present invention (800) will receive the request (701), identify the request using the new parameter (801), and will pass (802) the request for the delegated cookie information to an Authentication Server. The Authentication server will do the look up (not shown) on the delegate. The Authentication Server will return (803) all of the information it does for a normal user but the returned information is actually for the delegated user.

The significant difference here from the usual routing processes (and as an improvement to the content-based routing process) is the Authentication Server will substitute the distinguished name of the user in place of the delegate distinguished name. This information is passed (803) from the Authentication Server to the router in the form of HTML response headers. The Authentication Server will create non-standard HTML response headers containing the four possible paths for the delegated user:

/data?/company/dbname.nsf
/data0/company/special
/s/data?/dbname.nsf
/s/data?/special These response headers must contain the user's primary resource location in Delegated0 and Delegated1, and the secondary information is contained in Delegated2 and Delegated3. The router will have (804) one session table entry for the user and one for each delegated user. Each session table entry has the primary and secondary information for the appropriate user. The router will take the paths returned by the Authentication Server and use them in cookie creation (805), which are then used for redirection (806) to the delegated resource.

Session Table.

Figure 9:
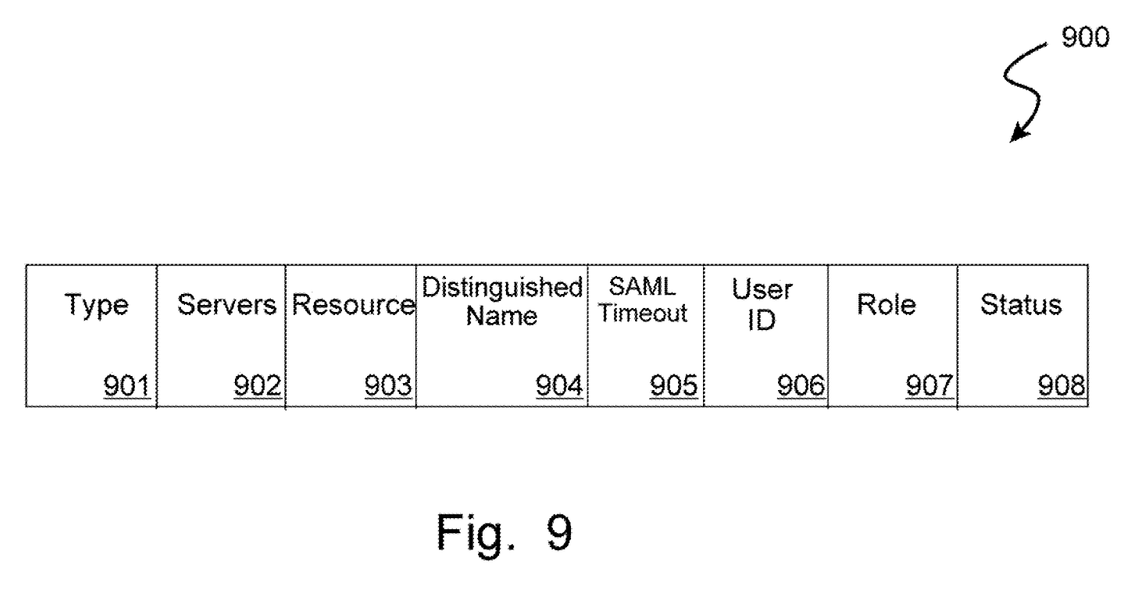
FIG. 9 illustrates a session table (lookup table) entry as enhanced to record a distinguished name field according to the invention.

The Session Table is an optional aspect of at least one available embodiment of the present invention. A Session Table entry (900) is accessed using a search key which is derived from either the routing cookie value or the delegated cookie value; each session table entry has the format shown in FIG. 9. The "type" field (901) is used to determine what fields will be populated in the entry. The "Servers" (902) and "Resource" (903) fields specify the target resource. The "Distinguished Name" (904), "SAML Time-out" (905), "User ID" (906), and "Role" (907) fields are used to determine if access will be granted to the resource. The "Status" (908) field is an internal router field. Please note the difference between the Session Table entry for a user (as described relative to the content-based routing process in FIG. 5) and the Session (lookup) Table (900) entry for the delegated user (of the present invention) is the addition of and the subsequent use in the routing process of the "Distinguished Name" (904) field.

Delegate Cookie Creation. To this point, embodiments of the present invention have been described with respect to the protocol and process for allowing a user to access a delegated resource after a delegate cookie has been created. In some embodiments of the invention, the delegate cookies may previously exist, and creation of delegate cookies is not necessary. For completeness of understanding at least one embodiment of the invention in which a delegate cookie does not previously exist, a process for creating such a delegate cookie is described now.

For illustrative purposes, consider a situation in which a user has already been assigned an entry in the Session Table to access a particular server (non-delegated server) while the user is in an electronic mail (email) application. Now, however, the user wishes to access a delegated email box owned by another user. So, the user activates a User Interface action (UI) to "open delegate mail" (or access some other type of delegate content in other scenarios). From this UI, the user would select another user's email box to access, presuming the user has permission to do so.

In response to this UI action (807, 810), a key (811) is created to be provided to the user's web browser (or other local application program) to identify the user as a delegate user. This key (e.g. newuser parameter) is appended to or embedded (812) in the URL which the user was using to access the directly-owned resource (e.g. the non-delegated resource). Preferably in another UI window or iFrame, the email program (or other application program) requests (701) to access the delegated email box using the URL including the key. But, in the authentication flow, the key is detected (801) in association with the URL of the request, and the user's request is redirected to the delegated resource.

However, rather than continue to use the URL with the key value in or appended to it, upon accessing the delegated resource for the first time, the server for the delegated resource requests creation of a domain-specific delegate cookie. Then, this delegate cookie is provided back to the user's browser (or other local application program) so that future requests will not have to have the modified URL with the key, but instead, may simply include the delegate cookie as previously described.

Conclusion.

A number of implementations have been described. Nevertheless, it will be understood that various modifications may be made while remaining within the scope of the following claims.

What is claimed is:

1. A method of computer routing network traffic comprising:
   during content-based routing of computer network traffic by a routing device and subsequent to an initial real-time look up to route a first user's traffic to a specific back-end server, determining that an access request contains at least one routing cookie;
   examining by the routing device the contained routing cookie to determine an original cookie scope according to an original path associated with the routing cookie;
   responsive to the original cookie scope being a root value adding to the access request by the routing device a delegation routing cookie having a scope of a delegation path value to a delegated resource associated with a first delegated user, wherein the first delegated user and the first user are different, and wherein the delegation path value is different from the original path value; and
   subsequently, by the routing device, redirecting the computer network traffic containing the delegation routine cookie to the delegated resource.

2. The method as set forth in claim 1 wherein a scope for a delegation path comprises a predetermined prefix to enable routing to a fail-over delegated resource.

3. The method as set forth in claim 2 wherein the prefix comprises "/s/".

4. The method as set forth in claim 2 wherein at least two of the plurality of different delegation routing cookies are associated with different web browser instances.

5. The method as set forth in claim 2 wherein at least two of the different delegation routing cookies are associated with different web browser frame segments or with different web browser tabs.

6. The method as set forth in claim 1 further comprising adding a plurality of different delegation routing cookies associated a plurality of with different delegated users.

7. A computer program product for routing network traffic comprising:
- a computer-readable storage memory device;
- first program instructions stored by the computer-readable storage memory device, to, during content-based routing of computer network traffic by a routing device and subsequent to an initial real-time look up to route a first user's traffic to a specific back-end server, determine that an access request contains a routing cookie;
- second program instructions stored by the computer-readable storage memory device, to examine the contained routing cookie to determine an original cookie scope according to a original path associated with the routing cookie;
- third program instructions stored by the computer-readable storage memory device, to, responsive to the original cookie scope being a root value, to add to the access request a delegation routing cookie having a scope of a delegation path value to a delegated resource associated with a first delegated user, wherein the first delegated user and the first user are different, and wherein the delegation path value is different from the original path value; and
- fourth program instructions stored by the computer-readable storage memory device, to, subsequently redirect the computer network traffic containing the delegation routing cookie to the delegated resource.

8. The computer program product as set forth in claim 7 wherein a delegation path comprises a predetermined prefix to enable routing to a fail-over delegated resource.

9. The computer program product as set forth in claim 7 wherein the program instructions for adding a delegation routing cookie comprises program instructions for adding a plurality of different delegation routing cookies associated with a plurality of different entities selected from the group consisting of different users, different delegated resources, different web browser instances, different web browser frame segments, and different web browser tabs.

10. A system for routing network traffic comprising:
- a data processing apparatus having hardware logic circuits for routing computer network traffic;
- a routing cookie detector portion of the data processing apparatus which, during content-based routing of computer network traffic and subsequent to an initial real-time look up to route a first user's traffic to a specific back-end server, determines that an access request contains a routing cookie;
- a routing cookie examiner portion of the data processing apparatus which examines the contained routing cookie to determine an original cookie scope according to an original path associated with the routing cookie;
- a delegate cookie designator portion of the data processing apparatus which, responsive to the original cookie scope being a root value, adds to the access request a delegation routing cookie having a scope of a delegation path value to a delegated resource associated with a first delegated user, wherein the first delegated user and the first user are different, and wherein the delegation path value is different from the original path value; and
- a traffic redirection portion of the data processing apparatus which subsequently redirects the computer network traffic containing the delegation routing cookie to the delegated resource.

11. The system as set forth in claim 10 wherein a scope for a delegation path comprises a predetermined prefix to enable routing to a fail-over delegated resource.

12. The system as set forth in claim 10 wherein the delegate cookie designator adds a plurality of different delegation routing cookies associated with a plurality of entities selected from the group consisting of different users, different delegated resources, different web browser instances, different web browser frame segments, and different web browser tabs.

* * * * *